Patented Nov. 20, 1951

2,575,444

UNITED STATES PATENT OFFICE 2,575,444

PRODUCTION OF PLASTICIZED RESIN COMPOSITIONS

Donald Faulkner, Cambridge, Herbert Muggleton Stanley, Tadworth, and Johann Josef Peter Staudinger, Ewell, England, assignors to The Distillers Company, Limited, Edinburgh, Scotland, a British company No Drawing. Application October 29, 1946, Serial No. 706,506. In Great Britain October 30, 1945

7 Claims. (Cl. 260—33.2)

This invention relates to new compositions of matter; more specifically it relates to the use of one or more ethers of alpha-methyl benzyl-alcohol or nuclear alkyl or halogen substitution products thereof, either alone, or in combination with other plasticising agents, as plasticising agents for polymers derived from chlorine-containing compounds, having in the molecule one group

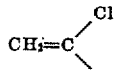

and hereinafter referred to as chloroethenoid compounds, or their copolymers with one another or with other polymerisable compounds; amongst the chloroethenoid compounds are vinyl chloride, vinylidene chloride, and alpha-chloroacrylic esters. Polymers of vinylidene chloride and copolymers thereof with acrylic esters, methacrylic esters, vinyl esters and other vinyl derivatives, are known in the art, as are also the polymers of vinyl chloride and alpha-chloroacrylic esters and their copolymers with the above copolymerisable materials. Most of these polymeric products, which will subsequently be referred to as polychloroethenoid compounds suffer from the disadvantage of undergoing decomposition and discolouration due to the effects of prolonged exposure to heat and/or light.

It is one object of the present invention to provide new compositions of matter comprising a polychloroethenoid compound which are of increased stability to heat and light. A further object of this invention is to impart to such polychloroethenoid compounds a higher degree of flexibility and plasticity. It is yet another object of this invention to render these polychloroethenoid compounds more amenable to the processes of moulding, rolling or extruding.

It is known in the art to admix the polychloroethenoid compounds with plasticisers such as phthalic acid esters, and stabilisers, such as lead compounds. There are few compounds known in the art which are capable of providing stability against the deleterious effect of heat and light, while serving, at the same time, as softeners and plasticisers.

We have now found that the foregoing and related objects may readily be attained according to the present invention which provides a composition comprising a polychloroethenoid compound and an ether or a mixture of ethers of the general formula:

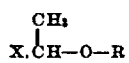

in which X represents an unsubstituted phenyl radical or a phenyl radical substituted by one or more halogen atoms and/or alkyl groups, and R represents a chain of carbon atoms of which one carbon atom is attached to the benzyl ether oxygen atom, which chain contains at least one hydroxyl group or esterified or etherified hydroxyl group or a combination of said groups substituted therein. The carbon chain may be either a saturated or unsaturated aliphatic chain, and in the case of an etherified hydroxyl group, the etherifying group is one of the following: alkyl, alkylol, alkenyl, alkynyl, aryl, aralkyl or a cyclo-aliphatic group; or where there is an esterified group it is esterified with a carboxylic group. The ethers are preferably, according to our invention, added to the polymer but they may be incorporated into the mixture either before polymerisation is effected, or during polymerisation.

Although the ethers of lower monohydric alcohols, such as the methyl, ethyl, propyl, butyl and amyl alcohol ethers of alpha-methyl benzyl alcohol, are also effective as stabilising agents, their comparatively low boiling point makes them less desirable in view of the loss by evaporation from the composition at the temperature of manipulation. On the other hand, the ethers of monohydric alcohols of more than 12 carbon atoms in the molecule have reduced compatability with the polymer. Although effective as a stabilising agent, we have found, for example, that the cetyl ether of alpha-methyl benzyl alcohol tends to exude from the composition owing to its limited compatability.

Suitable ethers are mono-, di-, or tri-ethers of alpha-methyl benzyl alcohol and saturated or unsaturated polyhydric alcohols such as ethylene glycol, diethylene glycol, the propane diols, the butane diols, the butene diols, butine diols, and glycerol.

The amount of the alpha-methyl benzyl ether to be employed may vary according to the type of polychloroethenoid compound and also according to the degree of plasticity and flexibility, which it is desired to impart into the composition. We have found that from 1% to 30% by weight as calculated on the final composition are the practical limits. Larger amounts than those indicated can be employed, but as a matter of economy it will be preferable to add other plasticisers to the composition to achieve an additional increase in plasticity and to employ these ethers primarily for their stabilising effect. The preferred and most practical amounts of these ethers for the protection of the said polymers against thermal instability are, therefore, from 1% to 30% by weight calculated on the final composition.

The ethers of the alpha-methyl benzyl type alcohol can conveniently be prepared by the method shown in British Patent No. 517,934, i. e. by reacting a polyhydric alcohol with styrene or its nuclear substituted derivatives in presence of a condensing agent; the reaction is believed to proceed by direct addition as follows:

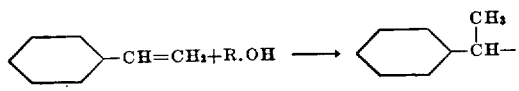

Instead of styrene, other vinyl aromatic hydrocarbons can be used, such as p-vinyl toluene, vinyl xylenes, vinyl pseudo-cumenes, vinyl-mesitylene, p-chlorostyrene and 2:5-dichloro-styrene. The ethers obtained by this general reaction, which contain one or more free hydroxyl groups, may be converted into further useful compounds by esterification or etherification of such hydroxyl groups; for example, ethylene glycol mono-alpha-methyl benzyl ether may be converted into the corresponding acetate by treatment with acetic anhydride. Such compounds may also be obtained by reacting styrene with a partially esterified or etherified polyhydric alcohol, such as ethylene glycol mono-acetate, or ethylene glycol mono-butyl ether.

Among the many alpha-methyl benzyl type alcohol ethers the following have been prepared and proved satisfactory for use in the process of this invention:

TABLE I

Ethylene glycol bis-alpha-methyl benzyl ether
Ethylene glycol mono-alpha-methyl benzylether
Alpha-methyl benzyl ether of ethylene glycol monoacetate
Propylene glycol mono-alpha-methyl benzyl ether
Alpha-methyl benzyl ether of propylene glycol monoacetate
Di(alpha-methyl-benzyl) ether of glycerol-1-monoacetate
Mono-alpha-methyl benzyl ether of glycerol-1:2-diacetate
Alpha-methyl benzyl-beta-butoxy ethyl ether
Mono-alpha-methyl benzyl ether of diethylene glycol
Mono-alpha-methyl benzyl ether of diethylene glycol monoacetate
Bis-alpha-methyl benzyl ether of diethylene glycol
Bis-alpha-methyl benzyl ether of butane-1:4-diol
Bis-alpha-methyl benzyl ether of butene-1:4-diol The method of producing ethers of the above type is illustrated in the following examples; the conditions of temperature and the catalyst or condensing agent and its concentration are, however, not limited to those mentioned.

PREPARATION OF ETHYLENE GLYCOL MONO-ALPHA-METHYL BENZYL ETHER AND ITS DERIVATIVES

A mixture of 86 grams of ethylene glycol, 214 grams of styrene, 1.8 grams of concentrated sulphuric acid, and 5 grams of pyrogallol was heated with continuous mechanical agitation at 95°–100° C. for 46 hours. After washing with a 5% by weight aqueous solution of sodium chloride to remove acid and unchanged glycol, the reaction mixture was distilled, giving 68 grams of styrene and 156 grams of reaction products boiling over a range of 80–130° C. at 2 mm. pressure. Fractionation of the latter gave 80 grams of fairly pure ethylene glycol mono-alpha-methylbenzyl ether, boiling at 58–64° C. at 1 mm. pressure, and 58.5 grams of fairly pure ethylene glycol bis-alpha-methylbenzyl ether, boiling at 100–110° C. at 1 mm. pressure. These two products were purified by further fractional distillation and the purified materials had the following physical constants:

| Ether | B. P. at 1 mm. °C. | Refractive Index at 20° |
|---|---|---|
| Ethylene glycol mono-alpha-methylbenzyl ether | 63–64 | 1.5142 |
| Ethylene glycol bis-alpha-methylbenzyl ether | 107–109 | 1.5307 |

The bis-ether was also synthesised from the mono-ether as follows:

0.1 mole of ethylene glycol mono-alpha-methylbenzyl ether was converted into its sodium derivative by warming with a suspension of 0.1 gram atom of powdered sodium in 100 ccs. of dry toluene. 0.1 mole of alpha-chloroethylbenzene was then added, and the mixture heated on the water bath for 35 hours. After carefully washing the mixture with water, the toluene was removed by distillation, and the residue fractionally distilled. Ethylene glycol bis-alpha-methyl benzyl ether was obtained, boiling at 107°–108° C. at 1 mm. pressure and having the following physical constants:

$$d_4^{20°} = 1.014$$
$$n_D^{20°} = 1.5294$$

These figures show the molecular refraction of the substance to be 82.1; the calculated value is 81.2.

Ethylene glycol mono-alpha-methylbenzyl ether, obtained as described above, was acetylated by warming with a slight excess of both acetic anhydride and pyridine. The reaction mixture was washed with dilute sulphuric acid to remove pyridine and then with sodium carbonate solution to remove acetic acid. The product was then distilled, giving the acetate of ethylene glycol mono-alpha-methyl-benzyl ether, which boiled at 69°–80° C. at 1 mm. pressure, and had $$n_D^{20°} = 1.4903$$

2.157 grams of this acetate required 10.35 ccs. of normal aqueous sodium hydroxide solution for complete saponification. Hence, the saponification number is 192.0. The saponification number required by theory is 192.3.

The same acetate of ethylene glycol mono-alpha-methyl-benzyl ether was also prepared by reacting ethylene glycol mono-acetate with styrene under conditions substantially identical with those used in the reaction between ethylene glycol and styrene.

The characteristics of some of these ethers are given below:

TABLE II

| | B. Pt., ° C. | $n_D^{30}$ |
|---|---|---|
| Ethylene glycol bis-alpha-methyl benzyl ether. | 107°/1 mm. | 1.5294 |
| Ethylene glycol mono-alpha-methyl benzyl ether. | 64°/1 mm. | 1.5142 |
| Alpha-methyl-benzyl ether of ethylene glycol monoacetate. | 70°/1 mm. | 1.4903 |
| Propylene glycol mono-alpha-methyl benzyl ether. | 63°/1 mm. | 1.5053 |
| Alpha-methyl benzyl ether of propylene glycol monoacetate. | 139°/15 mm. | 1.4842 |
| Di(alpha-methyl benzyl) ether of glycerol-1-monoacetate. | 101°/1 mm. | 1.5642 |
| Mono-alpha-methyl benzyl ether of glycerol 1:2 diacetate. | 91°/1 mm. | 1.4816 |
| Alpha-methyl benzyl-beta-butoxy ethyl ether. | 85°/0.7 mm. | 1.4802 |
| Mono-alpha-methyl benzyl ether of diethylene glycol. | 100°/1 mm. | 1.5062 |
| Mono-alpha-methyl benzyl ether of diethylene glycol monoacetate. | 111°/1 mm. | 1.4889 |
| Bis-alpha-methyl benzyl ether of diethylene glycol. | 139°/1 mm. | 1.5240 |
| Bis-alpha-methyl benzyl ether of butane 1:4 diol. | 104°/1 mm. | 1.5902 |
| Do. | 103°/1 mm. | 1.5737 |

The following examples illustrate the effect of certain of the above-mentioned plasticisers on the stability of polymers and copolymers prepared from chloroethenoid compounds in accordance with our invention.

Example 1

A copolymer prepared by polymerising, in emulsion, a mixture of 90 parts by weight of vinylidine chloride and 10 parts by weight of vinyl chloride was used for testing a series of the glycol and other alpha-methylbenzyl ethers of Table III below for their stabilising properties. The stabilising compound was incorporated by grinding together in a mortar 85 parts by weight of the copolymer and 15 parts by weight of the stabilising compound. The compounded copolymer was pressed at 175°–180° C. between polished plates to give a sheet of approximately 1 mm. thickness. The colour of this sheet, as well as its degree of freedom from bubbles, were observed. At the same time the bendability of the sheet was tested to give some indication of the plasticising action of the compound as well as the flow characteristics of the sheet.

Table IV below shows the results obtained using the compounds listed in Table III.

TABLE III

1. Ethylene glycol bis-alpha-methyl benzyl ether.
2. Ethylene glycol mono-alpha-methyl benzyl ether.
3. Alpha-methyl benzyl ether of ethylene glycol monoacetate.
4. Propylene glycol mono-alpha-methyl benzyl ether.
5. Alpha-methyl benzyl ether of propylene glycol monoacetate.
6. Di(alpha-methyl benzyl) ether of glycerol-1-monoacetate.
7. Mono-alpha-methyl benzyl ethers of glycerol-1:2-diacetate.
8. Alpha-methyl benzyl-beta-butoxy ethyl ether.
9. Mono-alpha-methyl benzyl ether of diethylene glycol.
10. Mono-alpha-methyl benzylether of diethylene glycol monoacetate.
11. Bis-alpha-methyl benzylether of diethylene glycol.
12. Bis-alpha-methyl benzylether of butane-1:4-diol.
13. Bis-alpha-methyl benzylether of butene-1:4-diol.

TABLE IV

| No. of Expt. | Colour of Sheet | Flow Properties | Bendability |
|---|---|---|---|
| 1 | Very pale yellow | Satisfactory | Good. |
| 2 | do | do | Do. |
| 3 | Pale yellow | Good | Do. |
| 4 | Almost colourless | do | Do. |
| 5 | Very pale yellow | do | Satisfactory. |
| 6 | do | Satisfactory | Good. |
| 7 | Yellow | Very good | Do. |
| 8 | Very pale yellow | Good | Do. |
| 9 | do | Satisfactory | Somewhat brittle. |
| 10 | do | Good | Good. |
| 11 | do | do | Do. |
| 12 | Pale yellow | Very good | Do. |
| 13 | Very pale yellow | do | Satisfactory. |

By way of comparison, tests were carried out using three conventional plasticisers, namely tricresyl phosphate, di-(cyclohexyl) phthalate and tetrahydrofurfuryl oleate, the amounts used and the details of the tests being as described above. With tricresyl phosphate the colour of the sheet was yellow to brown, the flow properties were fair and the bendability test showed the plasticised sheet to be rather brittle. With di(cyclohexyl) phthalate, the corresponding results were: colour, brown; flow, unsatisfactory; bendability, brittle and with tetrahydrofurfuryl oleate, colour, dark brown; flow, unsatisfactory and bendability, bad.

Example 2

1 mole of diethylene glycol and 2 moles of styrene were reacted at 95° C. in a similar manner to that described above. After removal of the catalyst by washing and after distilling off the unreacted styrene, the high-boiling fraction, boiling between 90°–139° C./1 mm. was collected. This fraction was found to consist of a mixture of the mono-alpha-methyl-benzyl ether and the bis-alpha-methyl benzyl ether of ethylene glycol. 15 grams of this mixture were admixed with 85 grams of a copolymer consisting of 85% by weight of vinylidene chloride, 10% by weight of vinyl chloride and 5% by weight of methyl acrylate. This mixture was then extruded at 175° C. to give almost colourless strings. When using tricresyl phosphate instead of the above mixture of alpha-methyl-benzyl ethers, the material did not flow readily at 175° C. and gave in addition a darker coloured string.

Example 3

The stabilising effect of various compounds was tested by the following method:

A mixture consisting of 85% by weight of the vinylidene chloride copolymer prepared from a mixture containing 93 parts by weight of vinylidene chloride, 5 parts by weight of vinyl chloride and 2 parts by weight of acrylonitrile and 15% by weight of stabilising compound was heated in a glass tube to 170° C. by immersion in an oil bath. A slow stream of dry nitrogen was passed through the mixture and was led from the glass tube to a small side arm containing a piece of Congo red paper. The rate of flow of nitrogen was kept steady at 5 litres per hour. The time which elapsed before the Congo red paper turned blue, indicating the first sign of hydrochloric acid evolution, was taken as a measure of the stabilising action of the compound added to the vinylidene chloride copolymer.

| No. of Expt. | Ether | Time in seconds |
|---|---|---|
| 1 | Diethylene glycol bis(alpha-methyl benzyl ether). | 310 |
| 2 | Alpha-methyl benzyl ether of ethylene glycol monoacetate. | 265 |
| 3 | mono-alpha-methyl benzyl ether of propylene glycol. | 245 |
| 4 | mono-alpha-methyl benzyl ether of glycerol 1:2 diacetate. | 224 |
| 5 | Bis-alpha-methyl benzyl ether of butane 1:4 diol. | 234 |
| 6 | Tricresyl phosphate. | 205 |
| 7 | Dioctyl sebacate. | 170 |
| 8 | Tetrahydrofurfuryl oleate. | 115 |

*Example 4*

100 grams of a polyvinyl chloride-polyvinyl acetate copolymer, containing 10% by weight of vinyl acetate, and 40 grams of mono-alpha-methyl benzyl glycerol-1:2-diacetate were rolled at 145° C. for 10 minutes. In almost colourless sheet was pressed from this mass which showed no signs of decomposition. When using dioctyl phthalate instead of the above ether in the same composition, a sheet of brownish colour was obtained indicating some decomposition of the polymer.

What we claim is:

1. A composition of matter comprising a polymer of the class consisting of polymers of compounds containing a single group

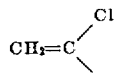

and copolymers thereof, and an ether of the general formula $$X-\underset{\underset{CH_3}{|}}{CH}-O-R$$

wherein X is a radical of the class consisting of the phenyl and halogen-substituted and alkyl-substituted phenyl radicals and R is a radical of the class consisting of saturated and unsaturated acylic carbon chains containing at least one hydroxyl group and the ethers and organic esters thereof said ether being present in an amount of 1% to 30% by weight of the composition.

2. A composition of matter comprising a polymer of the class consisting of polymers of compounds containing a single group

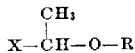

and copolymers thereof and an alpha-methyl benzyl ether of an alcohol of the class consisting of polyhydric saturated and unsaturated aliphatic alcohols and the partial ethers and partial organic esters thereof said ether being present in an amount of 1% to 30% by weight of the composiltion.

3. A composition of matter comprising a polymer of the class consisting of polymers of compounds containing a single group

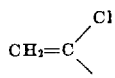

and copolymers thereof and an alpha-methyl benzyl ether of a polyethylene glycol said ether being present in an amount of 1% to 30% by weight of the composition.

4. A composition of matter comprising a polymer of the class consisting of polymers of compounds containing a single group

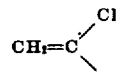

and copolymers thereof and a bis-alpha-methyl benzyl ether of a polyethylene glycol said ether being present in an amount of 1% to 30% by weight of the composition.

5. A composition of matter comprising a polymer of the class consisting of polymers of compounds containing a single group

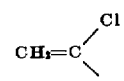

and copolymers thereof and a bis-alpha-methyl benzyl ether of an alcohol of the class consisting of polyhydric saturated and unsaturated aliphatic alcohols and the partial ethers and partial organic esters thereof said ether being present in an amount of 1% to 30% by weight of the composition.

6. A composition of matter comprising a polymer of the class consisting of polymers of compounds containing a single group

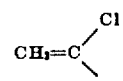

and copolymers thereof, and ethylene glycol alpha-methyl benzyl ether in the amount of 1 to 30% by weight of the composition.

7. A composition of matter comprising a polymer of the class consisting of polymers of compounds containing a single group

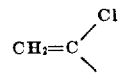

and copolymers thereof, and diethylene glycol alpha-methyl benzyl ether in the amount of 1 to 30% by weight of the composition.

DONALD FAULKNER.
HERBERT MUGGLETON STANLEY.
JOHANN JOSEF PETER STAUDINGER.

REFERENCES CITED

The following references are of record in the file of this patent:

UNITED STATES PATENTS

| Number | Name | Date |
|---|---|---|
| 2,351,102 | Britton et al. | June 13, 1944 |
| 2,360,897 | Sarbach | Oct. 24, 1944 |
| 2,384,973 | Smith | Sept. 18, 1945 |

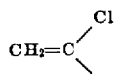

Certificate of Correction

Patent No. 2,575,444                                            November 20, 1951

DONALD FAULKNER ET AL.

It is hereby certified that error appears in the printed specification of the above numbered patent requiring correction as follows:

Column 4, line 61, for "69°–80° C." read *69°–70° C.*; column 5, Table II, first column thereof, last line, for "Do_____" read *Bis-alpha-methyl benzyl ether of butene 1:4 diol.*; column 5, line 47, after "same" insert *time*; column 7, line 62, for "composiltion" read *composition*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*

Certificate of Correction

Patent No. 2,575,444 — November 20, 1951

DONALD FAULKNER ET AL.

It is hereby certified that error appears in the printed specification of the above numbered patent requiring correction as follows:

Column 4, line 61, for "69°–80° C." read *69°–70° C.*; column 5, Table II, column thereof, last line, for "Do_____" read *Bis-alpha-methyl benzther of butene 1:4 diol.*; column 5, line 47, after "same" insert *time*; column 7, line 62, for "composiltion" read *composition*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*